United States Patent
Hada et al.

(10) Patent No.: US 9,753,057 B2
(45) Date of Patent: Sep. 5, 2017

(54) ACCELERATION SENSOR

(71) Applicant: Murata Manufacturing Co., Ltd., Nagaokakyo-shi, Kyoto-fu (JP)

(72) Inventors: Takuo Hada, Nagaokakyo (JP); Katsumi Fujimoto, Nagaokakyo (JP); Hideya Horiuchi, Nagaokakyo (JP); Toshimaro Yoneda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 459 days.

(21) Appl. No.: 14/499,324

(22) Filed: Sep. 29, 2014

(65) Prior Publication Data

US 2015/0013456 A1 Jan. 15, 2015

Related U.S. Application Data (63) Continuation of application No. PCT/JP2013/061147, filed on Apr. 15, 2013.

(30) Foreign Application Priority Data

Apr. 27, 2012 (JP) ................. 2012-102845

(51) Int. Cl.
*G01P 15/097* (2006.01)
*G01P 15/10* (2006.01)
(Continued)

(52) U.S. Cl.
CPC .............. *G01P 15/10* (2013.01); *G01P 15/09* (2013.01); *G01P 15/097* (2013.01); *G01P 2015/0828* (2013.01)

(58) Field of Classification Search
CPC .................................................. G01P 15/097
(Continued)

(56) References Cited

U.S. PATENT DOCUMENTS 4,893,509 A * 1/1990 MacIver ............. B81C 1/00142
216/2
2006/0236763 A1 10/2006 Terada et al.
(Continued)

FOREIGN PATENT DOCUMENTS

JP 9-211020 A 8/1997
JP 2000-180466 A 6/2000
(Continued)

OTHER PUBLICATIONS

Sato et al., "Study on a Resonance Type Micro Acceleration Sensor (1st Report)", Design and the Basic Evaluation with the 20-times Enlarged Model, vol. 74, No. 10, 2008, pp. 1051-1055.
(Continued)

*Primary Examiner* — John Chapman, Jr.
(74) *Attorney, Agent, or Firm* — Keating & Bennett, LLP (57) ABSTRACT

An acceleration sensor includes a fixation member, a weight member including a plate with two opposing sides parallel or substantially parallel to an X-direction and two opposing sides parallel to a Y-axis direction in a plan view, the weight member including a cutout extending in a direction about 45° relative to the X and Y axis directions, a vibrating beam linearly extending in the direction about 45° relative to the X and Y axis directions in the plan view, and one end portion is connected to the fixation member and the other end portion is connected to the weight member, the vibrating beam is partly arranged within the cutout and supporting the weight member to be displaceable in a Z-axis direction, a driver disposed on the vibrating beam and vibrating the vibrating beam, and a detector disposed on the vibrating beam and outputting a detection signal that is changed depending on deformation of the vibrating beam.

17 Claims, 9 Drawing Sheets

(51) Int. Cl.
*G01P 15/09* (2006.01)
*G01P 15/08* (2006.01)

(58) Field of Classification Search
USPC .................................................... 73/514.29
See application file for complete search history.

(56) References Cited

U.S. PATENT DOCUMENTS

2008/0223132 A1   9/2008   Terada et al.
2009/0322183 A1   12/2009  Kawakubo et al.

FOREIGN PATENT DOCUMENTS

| JP | 2000-206141 A | 7/2000 |
| JP | 2005-249446 A | 9/2005 |
| JP | 2006-308291 A | 11/2006 |
| JP | 2010-14406 A | 10/2010 |

OTHER PUBLICATIONS

Official Communication issued in International Patent Application No. PCT/JP2013/061147, mailed on Jun. 11, 2013.

\* cited by examiner

LENGTHWISE SIZE OF VIBRATING BEAM

ANGLE BETWEEN HOLDING BEAM AND VIBRATING BEAM

ACCELERATION SENSOR

BACKGROUND OF THE INVENTION

1. Field of the Invention

The present invention relates to an acceleration sensor configured to detect, in a state where a weight member is connected to a distal end of a vibrating portion of a cantilever beam and the vibrating portion is vibrated at a resonant frequency of the natural vibration thereof, a magnitude of acceleration from a change in a resonant frequency of the natural vibration of the vibrating portion, which is generated by applying acceleration to the weight member.

2. Description of the Related Art

There is known an acceleration sensor for detecting a magnitude of acceleration from a change in a resonant frequency of the natural vibration of a vibrating portion. Related-art acceleration sensors are described below.

Figure 9A:
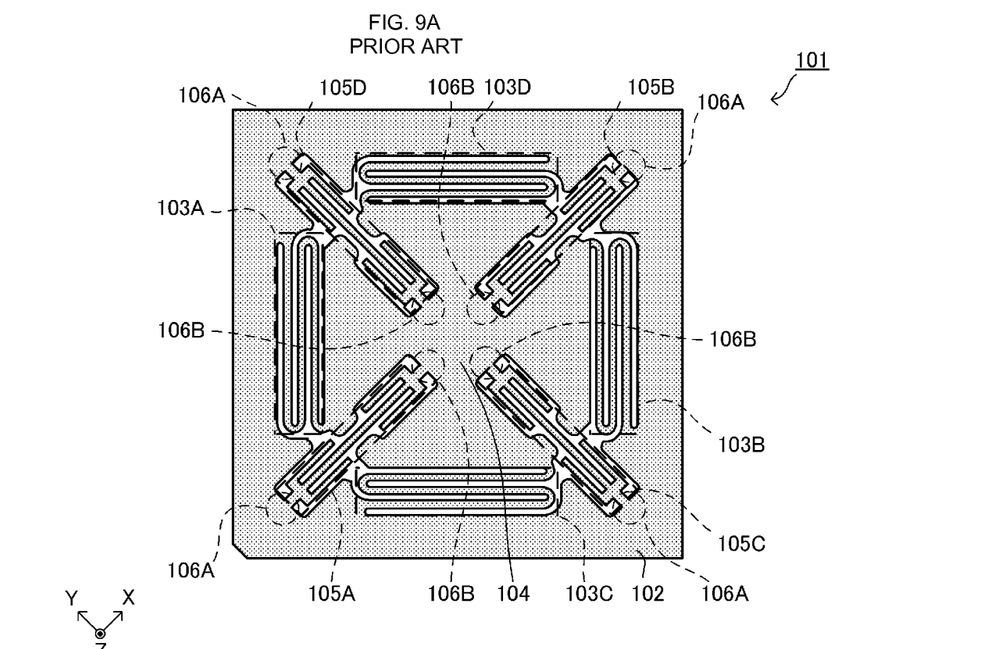
FIGS. 9A and 9B are explanatory views to explain an acceleration sensor according to first related art.

An acceleration sensor according to a first related art (see, e.g., Japanese Unexamined Patent Application Publication No. 2005-249446) includes an acceleration sensor device 101 and a control circuit (not illustrated). FIG. 9A is a plan view, looking at an X-Y plane, of the acceleration sensor device 101 that constitutes the acceleration sensor according to the first related art. The acceleration sensor device 101 includes a frame 102, holding members 103A, 103B, 103C and 103D, a support member 104, and vibrating plates 105A, 105B, 105C and 105D. In the following description, an axis extending in the lengthwise direction of the vibrating plates 105A and 105B of the acceleration sensor device 101 is defined as an X-axis of an orthogonal coordinate system, an axis being perpendicular to the X-axis and extending in the lengthwise direction of the vibrating plates 105C and 105D of the acceleration sensor device 101 is defined as a Y-axis of the orthogonal coordinate system, and an axis being perpendicular to both the X-axis and the Y-axis and extending in the direction normal to the vibrating plates 105A, 105B, 105C and 105D (i.e., the direction of thickness thereof) is defined as a Z-axis of the orthogonal coordinate system.

The frame 102 has an external shape in the form of a rectangular frame. The holding members 103A, 103B, 103C and 103D, the support member 104, and the vibrating plates 105A, 105B, 105C and 105D are arranged inside the frame. The vibrating plates 105A and 105B are arranged along one of diagonal lines of the frame 102. The vibrating plates 105C and 105D are arranged along the other diagonal line of the frame 102. Thus, the vibrating plates 105A, 105B, 105C and 105D are arranged in the X-Y plane to extend from a center position of the acceleration sensor device 101 in directions different through 90° between adjacent two of the vibrating plates. The vibrating plates 105A, 105B, 105C and 105D are each in the form of a beam. Each vibrating plate is connected to the frame 102 at one base portion 106A thereof, i.e., its end portion located on the side nearer to corner of the acceleration sensor device 101, and is connected to the support member 104 at the other base portion 106B thereof, i.e., its end portion located on the side nearer to the center position of the acceleration sensor device 101. The vibrating plates 105A, 105B, 105C and 105D each have a resonant frequency of the natural vibration thereof.

The holding members 103A, 103B, 103C and 103D are each arranged between adjacent two of the vibrating plates 105A, 105B, 105C and 105D. Each of the holding members 103A, 103B, 103C and 103D is in the form of a beam and is formed in a zigzag (meander) shape when looked at in a plan view. Respective one end portions of the holding members 103A, 103B, 103C and 103D are connected to the frame 102, and respective other end portions are connected to the support member 104. Thus, the support member 104 is supported by the holding members 103A, 103B, 103C and 103D to be reciprocally movable in the X-axis direction or the Y-axis direction.

Figure 9B:
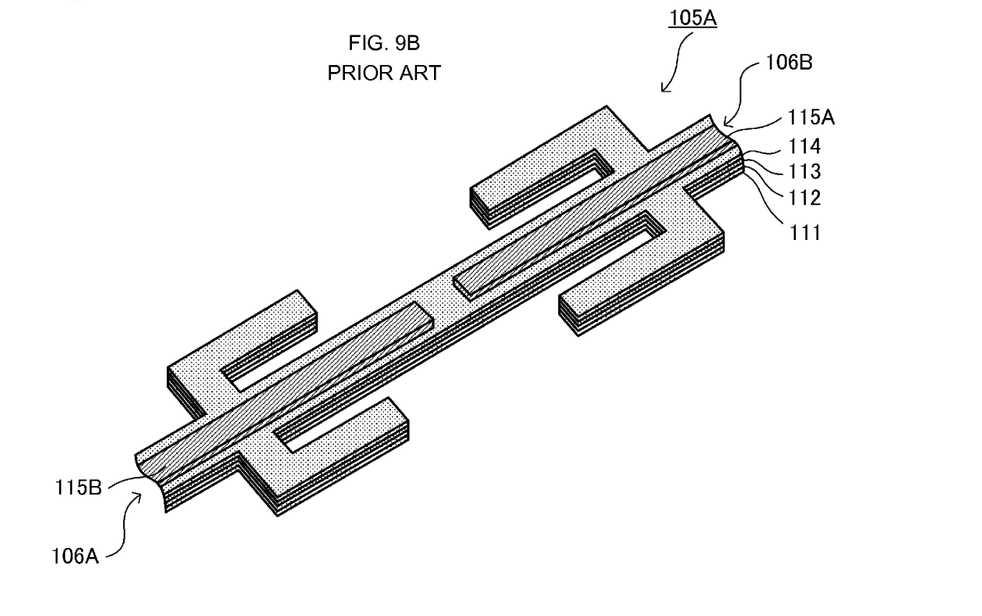

The support member 104 functions as a weight member. The support member 104 supports the vibrating plates 105 in cooperation with the frame 102. The support member 104 is disposed to change the resonant frequencies of the natural vibrations of the vibrating plates 105A, 105B, 105C and 105D. FIG. 9B is a perspective view illustrating, in an enlarged scale, the vibrating plate 105A in the acceleration sensor device 101 that constitutes the acceleration sensor according to the first related art. The vibrating plates 105B, 105C, and 105D have the same structure as that of the vibrating plate 105A.

The vibrating plate 105A includes a silicon (Si) layer 112 formed on a silicon dioxide ($SiO_2$) layer 111, a lower electrode layer 113 formed on the Si layer 112, a piezoelectric thin film layer 114 formed on the lower electrode layer 113, and an upper electrode layer made up of a driving electrode 115A and a detection electrode 115B both formed on the piezoelectric thin film layer 114. The driving electrode 115A is disposed over a region spanning from substantially a center of the vibrating plate 105 in the lengthwise direction thereof to its end portion on the same side as the base portion 106B, and is connected to a take-out electrode (not illustrated). The detection electrode 115B is disposed over a region spanning from substantially the center of the vibrating plate 105 in the lengthwise direction thereof to its end portion on the same side as the base portion 106A, and is connected to a take-out electrode (not illustrated). The take-out electrodes are connected to the control circuit.

In the acceleration sensor according to the first related art, when a driving signal from the control circuit is input to the driving electrode 115A, the piezoelectric thin film layer 114 is caused to expand and contract in its portion, which is positioned in a region where the driving electrode 115A and the lower electrode layer 113 are opposed to each other, upon application of an electric field caused by the driving signal. In such a manner, the vibrating plates 105A, 105B, 105C and 105D are each vibrated. At that time, with the vibration of the vibrating plate 105, pressure is exerted on a portion of the piezoelectric thin film layer 114, which portion is positioned in the region where the detection electrode 115B and the lower electrode layer 113 are opposed to each other, thereby generating electric charges. The generated electric charges are output as a detection signal from the detection electrode 115B. The control circuit drives the acceleration sensor device 101 by using the detection signal such that the vibrating plates 105A, 105B, 105C and 105D are each brought into a state where it is stably driven to vibrate at the resonant frequency of the natural vibration.

When acceleration in the X-axis direction or the Y-axis direction is applied to the acceleration sensor according to the first related art in the state where the vibrating plates 105A, 105B, 105C and 105D are driven and vibrated, the support member 104 is displaced in the X-axis direction or the Y-axis direction by an inertial force generated with the application of the acceleration. Forces acting on the vibrating plates 105A, 105B, 105C and 105D from the support member 104 with the deformation of the support member 104 cause the vibrating plates 105A, 105B, 105C and 105D in the driven and vibrated state to extend (or contract) in the X-axis direction or the Y-axis direction, whereby the resonant frequencies of the natural vibrations of the vibrating plates 105A, 105B, 105C and 105D are changed. Accordingly, the frequency of the detection signal is changed with the changes in the resonant frequencies of the natural vibrations of the vibrating plates 105A, 105B, 105C and 105D. Hence a magnitude of the applied acceleration can be detected from the frequency change of the detection signal.

An acceleration sensor according to a second related art (see, e.g., Study on a Resonance Type Micro Acceleration Sensor (1st Report)", Journal of Japan Society for Precision Engineering Vol. 74, No. 10, 2008 pp. 1051-1055) includes an acceleration sensor device 201 and a control circuit (not illustrated).

Figure 10:
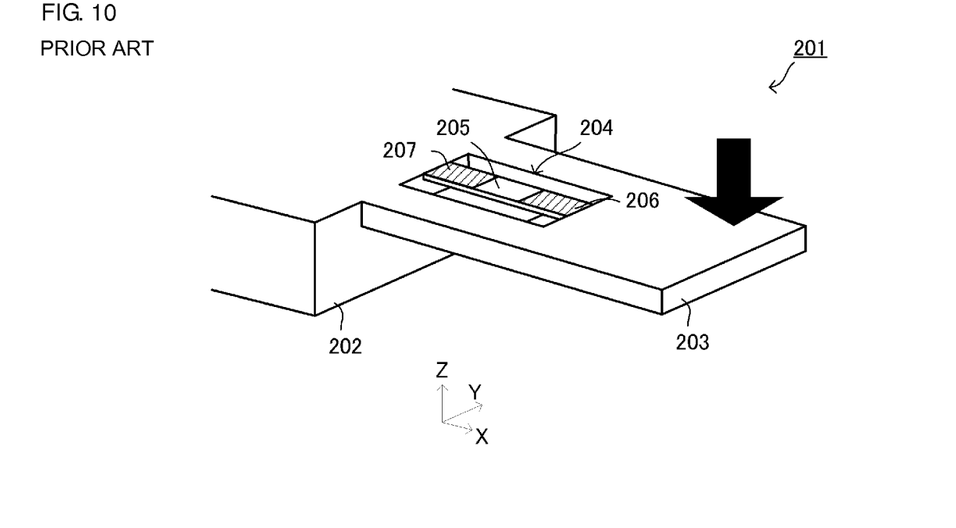
FIG. 10 is an explanatory view to explain an acceleration sensor according to second related art.

FIG. 10 is a perspective view of the acceleration sensor device 201 that constitutes the acceleration sensor according to the second related art. The acceleration sensor device 201 includes a fixation member 202 and a cantilever beam 203. In the following description, an axis extending in the lengthwise direction of the cantilever beam 203 of the acceleration sensor device 201 is defined as an X-axis of an orthogonal coordinate system, an axis being perpendicular to the X-axis and extending in the widthwise direction of the cantilever beam 203 of the acceleration sensor device 201 is defined as a Y-axis of the orthogonal coordinate system, and an axis being perpendicular to both the X-axis and the Y-axis and extending in the direction normal to the cantilever beam 203 (i.e., the direction of thickness thereof) is defined as a Z-axis of the orthogonal coordinate system.

The fixation member 202 has a rectangular external shape when looked at in a plan view. The cantilever beam 203 is fixed to the fixation member 202. The cantilever beam 203 has one end connected to the fixation member 202 and the other end that is a free end. When acceleration in the Z-axis direction is applied to the acceleration sensor according to the second related art, the cantilever beam 203 is deformed by an inertial force generated with the application of the acceleration. In a region of the cantilever beam 203 nearer to the fixation member 202, an opening 204 having a rectangular shape when looked at in a plan view is formed such that the lengthwise direction of the opening 204 is oriented in the X-axis direction and the widthwise direction of the opening 204 is oriented in the Y-axis direction. In the opening 204, a diaphragm 205 in the form of a cantilever beam is disposed such that the lengthwise direction of the diaphragm 205 is oriented in the X-axis direction and the widthwise direction of the diaphragm 205 is oriented in the Y-axis direction, and such that both end portions of the diaphragm 205 in the X-axis direction are connected to the cantilever beam 203. A vibrator 206 is disposed at one side of the diaphragm 205 in the X-axis direction, and a receiver 207 is disposed at the other side. The vibrator 206 vibrates the diaphragm 205 at a resonant frequency. The receiver 207 converts the vibration of the diaphragm 205 to an electrical signal.

The acceleration sensor according to the first related art detects the acceleration in the X-axis direction and the Y-axis direction, but it cannot detect the acceleration in the Z-axis direction with high sensitivity. The acceleration sensor according to the second related art detects the acceleration in the Z-axis direction. However, the acceleration sensor according to the second related art cannot provide high detection sensitivity because, when looked at in a plan view, the diaphragm 205 is arranged to perpendicularly intersect one side of the external shape of the fixation member 202 to which the cantilever beam 203 is fixed.

SUMMARY OF THE INVENTION

Preferred embodiments of the present invention provide an acceleration sensor capable of detecting acceleration with high detection sensitivity.

Preferred embodiments of the present invention provide an acceleration sensor including a fixation member, a weight member, a vibrating beam, a driver, and a detector. The fixation member has an external shape preferably in the form of a rectangular or substantially rectangular frame. The weight member is preferably in the form of a quadrangular or substantially quadrangular plate including two opposing sides parallel or substantially parallel to a first direction and two opposing sides parallel or substantially parallel to a second direction perpendicular or substantially perpendicular to the first direction when looked at in a plan view. The weight member includes a cutout that extends in a direction preferably at an angle of about 45° relative to the first direction and the second direction. The vibrating beam is disposed to linearly extend in the direction preferably at the angle of about 45° relative to the first direction and the second direction when looked at in a plan view. The vibrating beam has one end portion connected to the fixation member and the other end portion connected to the weight member, and it is partly arranged within the cutout. The vibrating beam supports the weight member to be displaceable in a third direction that is perpendicular or substantially perpendicular to the first direction and the second direction. The driver is disposed on the vibrating beam and vibrates the vibrating beam. The detector is disposed on the vibrating beam and outputs a detection signal that is changed depending on deformation of the vibrating beam.

In the acceleration sensor described above, preferably, a connected position between the vibrating beam and the weight member is located near or adjacent to a barycentric position of the weight member.

In the acceleration sensor described above, preferably, when a reference size is defined as a lengthwise size of the vibrating beam in a state that one end portion of the vibrating beam in a lengthwise direction thereof is connected to the fixation member, and that the other end portion of the vibrating beam is connected to the weight member at the barycentric position of the weight member, the lengthwise size of the vibrating beam is not less than about 0.6 times and less than about 1.2 times the reference size, for example.

More preferably, the lengthwise size of the vibrating beam is not less than about 1.0 times and less than about 1.2 times the reference size, for example.

The acceleration sensor described above preferably further includes a first holding beam and a second holding beam each having one end portion connected to the fixation member and the other end portion connected to the weight member, the first holding beam and the second holding beam being arranged line-symmetrically with an axis of symmetry defined as an axis extending in the direction defining an angle of about 45° relative to the first direction and the second direction.

More preferably, the first holding beam is connected to the weight member at one edge of an opening of the cutout, and the second holding beam is connected to the weight member at the other edge of the opening of the cutout.

More preferably, an angle defined by each of the first and second holding beams relative to the vibrating beam is not smaller than about 60° and smaller than about 135°, for example.

The acceleration sensor described above preferably further includes a first holding beam having one end portion connected to the fixation member and the other end portion connected to the weight member, the first holding beam including a first partial holding beam disposed to extend in the first direction and a second partial holding beam disposed to extend in the second direction, and a second holding beam having one end portion connected to the fixation member and the other end portion connected to the weight member, the second holding beam including a first partial holding beam disposed to extend in the second direction and a second partial holding beam disposed to extend in the first direction.

According to various preferred embodiments of the present invention, acceleration sensors capable of detecting acceleration with high detection sensitivity are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
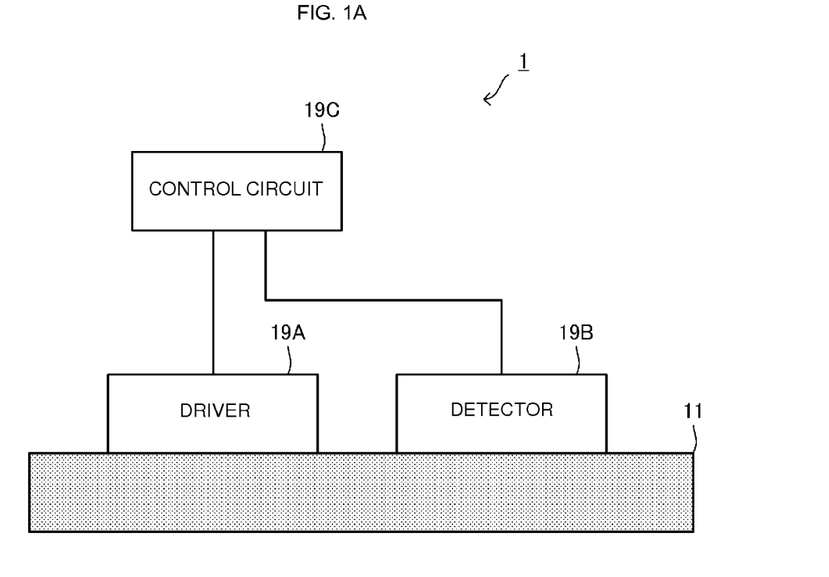
FIGS. 1A and 1B are explanatory views to explain an acceleration sensor according to a first preferred embodiment of the present invention, and an acceleration sensor device constituting the acceleration sensor.

An acceleration sensor 1 according to a first preferred embodiment of the present invention will be described below. FIG. 1A is a block diagram to explain the configuration of the acceleration sensor 1 according to the first preferred embodiment of the present invention. The acceleration sensor 1 includes an acceleration sensor device 11 and a control circuit 19C. The acceleration sensor device 11 includes a driver 19A and a detector 19B. The control circuit 19C is connected to the driver 19A and the detector 19B.

Figure 1B:
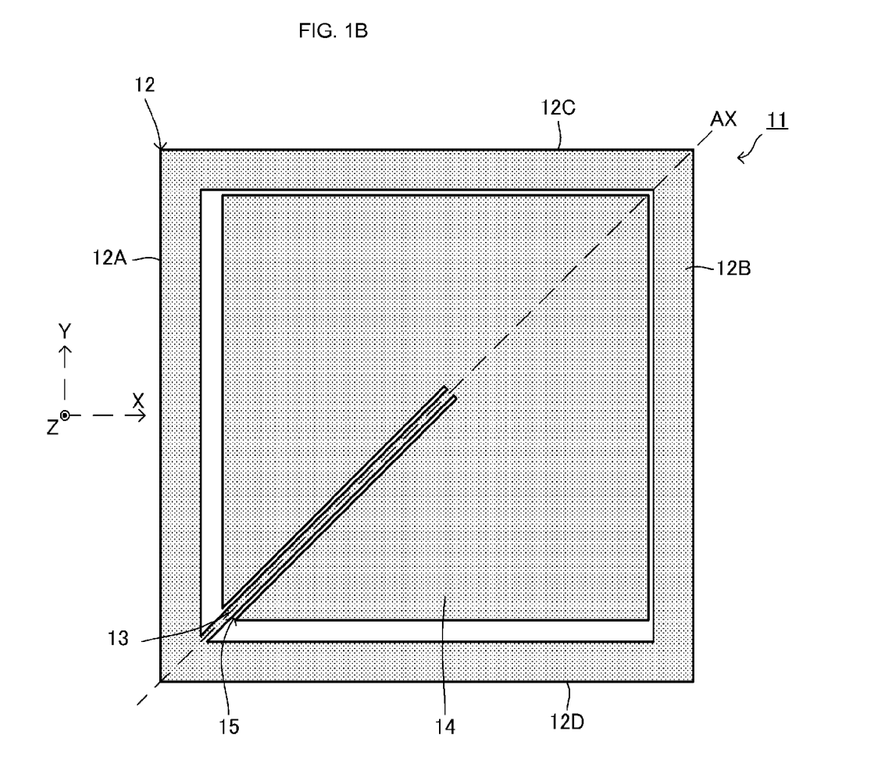

FIG. 1B is a plan view, looking at an X-Y plane, of the acceleration sensor device 11. As illustrated in FIG. 1B, the acceleration sensor device 11 includes a fixation member 12, a vibrating beam 13, a weight member 14, and a support substrate (not illustrated).

The fixation member 12, the vibrating beam 13, and the weight member 14 preferably are each made of silicon and are formed by etching a silicon substrate, for example. The silicon substrate preferably has a thickness of about 20 μm and a density of about 2331 kg/m$^3$, for example.

The fixation member 12 preferably is a frame-shaped member having a rectangular or substantially rectangular external shape. The vibrating beam 13 and the weight member 14 are arranged inside the fixation member 12. The fixation member 12 is joined at its lower surface to the support substrate, and it supports the vibrating beam 13 and the weight member 14 in a state floating from the support substrate. In the following description, an axis extending along the direction in which one paired sides of two pairs of opposing sides of the fixation member 12 extend when looking at the fixation member 12 in a plan view is defined as an X-axis of an orthogonal coordinate system, an axis being perpendicular to the X-axis and extending in the direction in which the other paired sides extend is defined as a Y-axis of the orthogonal coordinate system, and an axis being perpendicular to both the X-axis and the Y-axis and extending in the direction normal to the fixation member 12 (i.e., the direction of thickness thereof) is defined as a Z-axis of the orthogonal coordinate system. The fixation member 12 has a point-symmetric shape with respect to its center point in the X-Y plane, and it is made up of fixation-member constituting portions 12A, 12B, 12C and 12D. The fixation-member constituting portions 12A and 12B are disposed to extend in the Y-axis direction. Each of the fixation-member constituting portions 12A and 12B is connected at its end portion on the positive direction side of the Y-axis to the fixation-member constituting portion 12C, and is connected at its end portion on the negative direction side of the Y-axis to the fixation-member constituting portion 12D. The fixation-member constituting portion 12A is arranged on the negative direction side of the X-axis. The fixation-member constituting portion 12B is arranged on the positive direction side of the X-axis. The fixation-member constituting portions 12C and 12D are disposed to extend in the X-axis direction. Each of the fixation-member constituting portions 12C and 12D is connected at its end portion on the positive direction side of the X-axis to the fixation-member constituting portion 12B, and is connected at its end portion on the negative direction side of the X-axis to the fixation-member constituting portion 12A. The fixation-member constituting portion 12C is arranged on the positive direction side of the Y-axis. The fixation-member constituting portion 12D is arranged on the negative direction side of the Y-axis. The fixation member 12 preferably has external dimensions of approximately 2.4 mm×2.4 mm and internal dimensions of approximately 2.01 mm×2.01 mm, for example.

The vibrating beam 13 is a member having a linear shape when looked at in a plan view. In more detail, one end portion of the vibrating beam 13 in the lengthwise direction thereof is connected to a region in the frame of the fixation member 12 where the fixation-member constituting portion 12A and the fixation-member constituting portion 12D are connected to each other, while the other end portion of the vibrating beam 13 is connected to the weight member 14. The vibrating beam 13 is disposed such that the lengthwise direction thereof is aligned with the direction defining an angle of about 45° relative to the X-axis and the Y-axis in the X-Y plane, for example. In other words, the vibrating beam 13 is disposed to extend in the direction of a diagonal line of the fixation member 12. The vibrating beam 13 preferably has a length of about 1.5 mm and a width of about 40 μm, for example.

The weight member 14 preferably is in the form of a quadrangular or substantially quadrangular plate including two opposing sides parallel or substantially parallel to the X-axis and two opposing sides parallel or substantially parallel to the Y-axis when looked at in a plan view. The weight member 14 includes a cutout 15 extending in the direction defining an angle of about 45° relative to the X-axis and the Y-axis in the X-Y plane such that, in the X-Y plane, the cutout 15 extends, up to the vicinity of a barycentric position of the weight member 14, from a portion where one side of the weight member 14 extending parallel or substantially parallel to the Y-axis and positioned on the negative direction side of the X-axis intersects another side of the weight member 14 extending parallel or substantially parallel to the X-axis and positioned on the negative direction side of the Y-axis. The end portion of the vibrating beam 13 is connected to the weight member 14 at an edge of the cutout 15 on the side near or adjacent to the barycentric position. Thus, the vibrating beam 13 is partly arranged within the cutout 15. The weight member 14 preferably has external dimensions of approximately 1.9 mm×1.9 mm, and a gap size between edges of the cutout 15 and the vibrating beam 13 is about 40 μm, for example. In the acceleration sensor device 11, when viewed in the X-Y plane, a diagonal line of the internal shape of the fixation member 12, a diagonal line of the external shape of the weight member 14, a centerline of the cutout 15 extending in the direction in which it extends, and a centerline of the vibrating beam 13 extending in the lengthwise direction thereof pass the barycentric position of the weight member 14 and are coincident with an axis (AX axis) that preferably defines an angle of about 45° relative to the X-axis and the Y-axis, for example.

Because the AX axis is perpendicular to the Z-axis, the vibrating beam 13 disposed to extend in the AX axis is configured to perform resiliency flexing in the Z-axis direction. Therefore, the weight member 14 supported by the vibrating beam 13 is displaceable in the Z-axis direction. Accordingly, when acceleration in the Z-axis direction is applied to the acceleration sensor device 11, the weight member 14 is displaced in the Z-axis direction.

Additionally, because the vibrating beam 13 is partly arranged within the cutout 15, a proportion of an area occupied by the vibrating beam 13 and the weight member 14 with respect to an area restricted within the frame of the fixation member 12 in the X-Y plane is significantly increased or maximized.

Figure 2A:
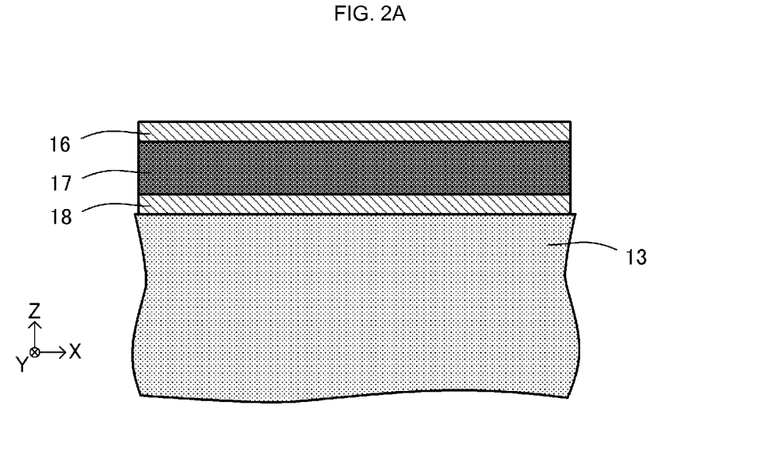
FIGS. 2A and 2B are schematic views to explain the structure of a vibrating beam in the acceleration sensor device that constitutes the acceleration sensor according to the first preferred embodiment of the present invention.
Figure 2B:
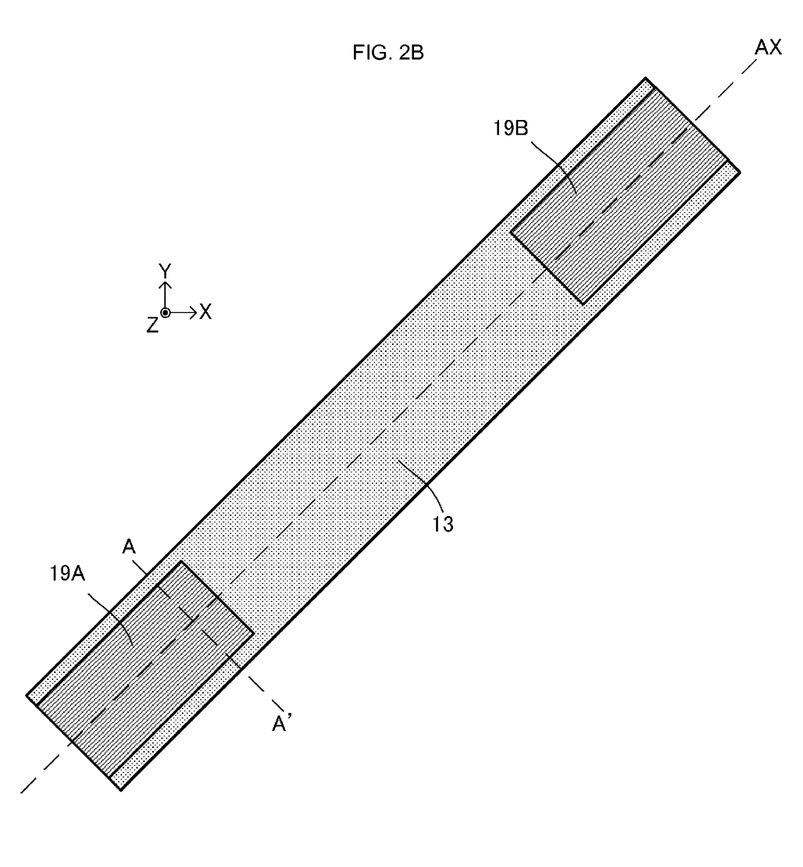

FIG. 2A is a sectional view, taken along an X-Z plane, of a particular portion of the vibrating beam 13 in the acceleration sensor device 11. FIG. 2B is a plan view, looking at an X-Y plane, of the vibrating beam 13 in the acceleration sensor device 11. FIG. 2A illustrates a section taken along a broken line A-A' in FIG. 2B.

As illustrated in FIG. 2B, the driver 19A and the detector 19B are disposed on the vibrating beam 13. Each of the driver 19A and the detector 19B has the structure illustrated in FIG. 2A. As illustrated in FIG. 2A, the driver 19A and the detector 19B are each constituted by a lower electrode layer 18 disposed on the upper surface side of the vibrating beam 13 (i.e., on the positive direction side of the Z-axis), a piezoelectric layer 17 disposed on the lower electrode layer 18, and an upper electrode layer 16 disposed on the piezoelectric layer 17. The piezoelectric layer 17 preferably is a thin film made of a piezoelectric material, such as aluminum nitride, PZT, sodium potassium niobate, or zinc oxide. The lower electrode layer 18 defines and serves as an electrode connected to the ground, and it is joined to the vibrating beam 13. The upper electrode layer 16 defines and serves an electrode that extends to the fixation member 12, illustrated in FIG. 1B, through a lead wiring (not illustrated), and that is electrically connected to the control circuit 19C illustrated in FIG. 1A.

The driver 19A is disposed in a region of the vibrating beam 13, the region including an end portion of the vibrating beam 13 connected to the fixation member 12, and the detector 19B is disposed in a region of the vibrating beam 13, the region including an end portion of the vibrating beam 13 connected to the weight member 14.

In the acceleration sensor 1, when a driving signal is input to the upper electrode layer 16 of the driver 19A from the control circuit 19C, the vibrating beam 13 is driven and vibrated. More specifically, when the driving signal is input to the upper electrode layer 16 of the driver 19A, an electric field is applied to the piezoelectric layer 17, thus causing the piezoelectric layer 17 to extend and contract. With the extension and the contraction of the piezoelectric layer 17 of the driver 19A, the vibrating beam 13 is vibrated. When the vibrating beam 13 is driven and vibrated in such a manner, a resonant frequency of the natural vibration thereof is about 68 kHz, for example. The vibration mode generated when the vibrating beam 13 is driven and vibrated may be any vibration mode insofar as the resonant frequency of the natural vibration of the vibrating beam 13 is changed with flexing in the Z-axis direction. However, the vibration mode in which the vibrating beam 13 extends and contracts in the lengthwise direction thereof, or the vibration mode in which the vibrating beam 13 flexes in the Z-axis direction is preferable for the reason that change in the natural vibration frequency of the vibrating beam 13 caused by the flexing in the Z-axis direction is relatively large.

When the vibrating beam 13 is driven and vibrated, pressure is exerted on the piezoelectric layer 17 of the detector 19B, and electric charges are generated in the piezoelectric layer 17. The generated electric charges are output as a detection signal to the control circuit 19C from the upper electrode layer 16 of the detector 19B. The control circuit 19C drives the acceleration sensor device 11 by using the detection signal such that the vibrating beam 13 is brought into a state where it is stably driven to vibrate at the resonant frequency of the natural vibration.

When acceleration in the Z-axis direction is applied to the acceleration sensor device 11 in the state where the vibrating beam 13 is driven and vibrated, the weight member 14 is displaced in the Z-axis direction relative to the fixation member 12 by an inertial force generated with the application of the acceleration. A force acting on the vibrating beam 13 from the weight member 14 with the displacement of the weight member 14 causes the vibrating beam 13 in the driven and vibrated state to deform in a way flexing in the Z-axis direction, such that the resonant frequency of the natural vibration of the vibrating beam 13 is changed. Accordingly, the frequency of the detection signal is changed with the change in the resonant frequency of the natural vibration of the vibrating beam 13. Hence a magnitude of the applied acceleration is detected from the frequency change of the detection signal.

The control circuit 19C detects, from the output signal of the detector 19B, the frequency change of the output signal. The frequency of the output signal corresponds with the resonant frequency of the natural vibration of the vibrating beam 13. Thus, when the resonant frequency of the natural vibration is changed with the application of the acceleration in the Z-axis direction to the acceleration sensor device 11, the frequency of the output signal is also changed. Accordingly, the control circuit 19C detects the presence or the absence of acceleration applied to the acceleration sensor device 11 in the Z-axis direction and the magnitude of the applied acceleration by detecting the output signal of the detector 19B, of which frequency is changed depending on the magnitude of the acceleration applied to the acceleration sensor device 11 in the Z-axis direction.

Figure 3:
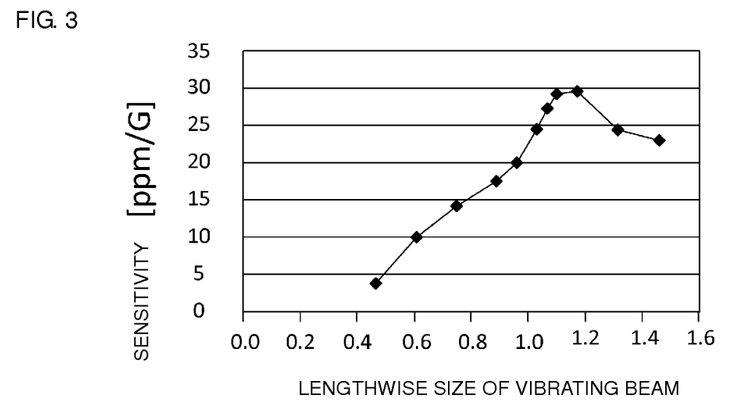
FIG. 3 is a graph to explain the influence of dimensional setting of the acceleration sensor device that constitutes the acceleration sensor according to the first preferred embodiment of the present invention.

The results of measuring sensitivity of the acceleration sensor 1 according to the first preferred embodiment for the acceleration in the Z-axis direction, while a lengthwise size of the vibrating beam 13 in the acceleration sensor device 11 is changed, will be described below. FIG. 3 is a graph plotting the relation between the lengthwise size of the vibrating beam 13 and the sensitivity for the acceleration in the Z-axis direction in the acceleration sensor 1.

Here, a reference size is defined as the lengthwise size of the vibrating beam 13 in the state that one end portion of the vibrating beam 13 in the lengthwise direction thereof is connected to the region of the fixation member 12 where the fixation-member constituting portion 12A and the fixation-member constituting portion 12D are connected to each other, and that the other end portion of the vibrating beam 13 is connected to the weight member 14 at the barycentric position of the weight member 14. When the lengthwise size of the vibrating beam 13 is changed in the state that the connected position between the vibrating beam 13 and the fixation member 12 is kept stationary, the sensitivity for the acceleration in the Z-axis direction is increased on the condition that the lengthwise size of the vibrating beam 13 is not less than about 0.6 times and less than about 1.2 times the reference size, for example. In particular, the sensitivity for the acceleration in the Z-axis direction is more significantly increased when the lengthwise size of the vibrating beam 13 is not less than about 1.0 times and less than about 1.2 times the reference size, for example. On the other hand, the sensitivity for the acceleration in the Z-axis direction is reduced when the lengthwise size of the vibrating beam 13 is less than about 0.6 times or not less than about 1.2 times the reference size. The reason is that when the connected position between the vibrating beam 13 and the weight member 14 is deviated from the barycentric position of the weight member 14, undesired vibration is generated in the weight member 14. Thus, the connected position between the vibrating beam 13 and the weight member 14 is preferably located near or adjacent to the barycentric position of the weight member 14.

Figure 4:
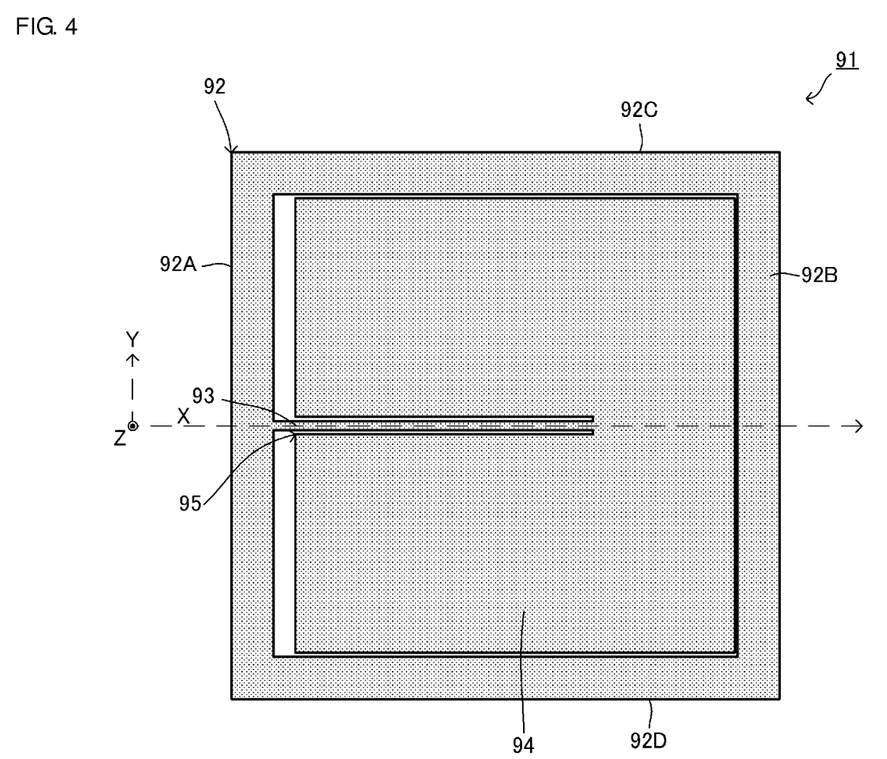
FIG. 4 is an explanatory view to explain an acceleration sensor device that constitutes an acceleration sensor according to COMPARATIVE EXAMPLE 1.

Next, an acceleration sensor according to COMPARATIVE EXAMPLE 1 was prepared and its sensitivity for the acceleration in the Z-axis direction was measured for comparison with that of the acceleration sensor 1 according to the first preferred embodiment of the present invention. The acceleration sensor according to COMPARATIVE EXAMPLE 1 includes an acceleration sensor device 91 in which the connected position between the vibrating beam and the fixation member is different from that in the acceleration sensor 1 according to the first preferred embodiment. FIG. 4 is a plan view, looking at an X-Y plane, of the acceleration sensor device 91 that constitutes the acceleration sensor according to COMPARATIVE EXAMPLE 1. Materials and dimensions of a fixation member, a vibrating beam, and a weight member of the acceleration sensor device 91 are the same as those in the acceleration sensor device 11 of the acceleration sensor 1 according to the first preferred embodiment.

As illustrated in FIG. 4, the acceleration sensor device 91 includes a fixation member 92, a vibrating beam 93, a weight member 94, and a support substrate (not illustrated). The fixation member 92 preferably is a frame-shaped member having a rectangular or substantially rectangular external shape. The fixation member 92 is joined at its lower surface to the support substrate, and it supports the vibrating beam 93 and the weight member 94 in a state floating from the support substrate. The fixation member 92 preferably includes fixation-member constituting portions 92A, 92B, 92C and 92D. The fixation-member constituting portions 92A and 92B are disposed to extend in the Y-axis direction. Each of the fixation-member constituting portions 92A and 92B is connected at its end portion on the positive direction side of the Y-axis to the fixation-member constituting portion 92C, and is connected at its end portion on the negative direction side of the Y-axis to the fixation-member constituting portion 92D. The fixation-member constituting portion 92A is arranged on the negative direction side of the X-axis. The fixation-member constituting portion 92B is arranged on the positive direction side of the X-axis. The fixation-member constituting portions 92C and 92D are disposed to extend in the X-axis direction. Each of the fixation-member constituting portions 92C and 92D is connected at its end portion on the positive direction side of the X-axis to the fixation-member constituting portion 92B, and is connected at its end portion on the negative direction side of the X-axis to the fixation-member constituting portion 92A. The fixation-member constituting portion 92C is arranged on the positive direction side of the Y-axis. The fixation-member constituting portion 92D is arranged on the negative direction side of the Y-axis. The vibrating beam 93 is a member having a linear shape when looked at in a plan view. One end portion of the vibrating beam 93 in the lengthwise direction thereof is connected to a central region of the fixation-member constituting portion 92A in the Y-axis direction within the frame of the fixation member 92, while the other end portion of the vibrating beam 93 is connected to the weight member 94. The vibrating beam 93 is disposed such that the lengthwise direction thereof is aligned with the X-axis direction in the X-Y plane. The weight member 94 preferably is in the form of a quadrangular or substantially quadrangular plate having two opposing sides parallel or substantially parallel to the X-axis and two opposing sides parallel or substantially parallel to the Y-axis when looked at in a plan view. The weight member 94 includes a cutout 95 extending in the X-axis direction in the X-Y plane such that, in the X-Y plane, the cutout 15 extends from a central portion of a side of the weight member 94, the side extending parallel or substantially parallel to the Y-axis and being positioned on the negative direction side of the X-axis, toward a barycentric position of the weight member 94. The end portion of the vibrating beam 93 is connected to the weight member 94 at an edge of the cutout 95 on the side near or adjacent to the barycentric position. Thus, the vibrating beam 93 is partly arranged within the cutout 95.

In the acceleration sensor device 11 of the acceleration sensor 1 according to the first preferred embodiment, the distance from the opening of the cutout 15 to the barycentric position of the weight member 14 preferably is about 2.5 times the distance from the opening of the cutout 95 to the barycentric position of the weight member 94 in the acceleration sensor device 91 of the acceleration sensor according to COMPARATIVE EXAMPLE 1. Therefore, even when the lengthwise size of the vibrating beam 13 is increased, the connected position between the vibrating beam 13 and the weight member 14 is capable of being located near or adjacent to the barycentric position of the weight member 14. As a result, the undesired vibration is easily prevented from being generated in the weight member 14.

The sensitivity of the acceleration sensor according to COMPARATIVE EXAMPLE 1 for the acceleration in the Z-axis direction was 10 ppm/G. In contrast, the sensitivity of the acceleration sensor 1 according to the first preferred embodiment for the acceleration in the Z-axis direction was 30 ppm/G, for example. Thus, the sensitivity of the acceleration sensor 1 according to the first preferred embodiment for the acceleration in the Z-axis direction is significantly increased from that of the acceleration sensor according to COMPARATIVE EXAMPLE 1.

Second Preferred Embodiment

An acceleration sensor according to a second preferred embodiment of the present invention will be described below.

Figure 5A:
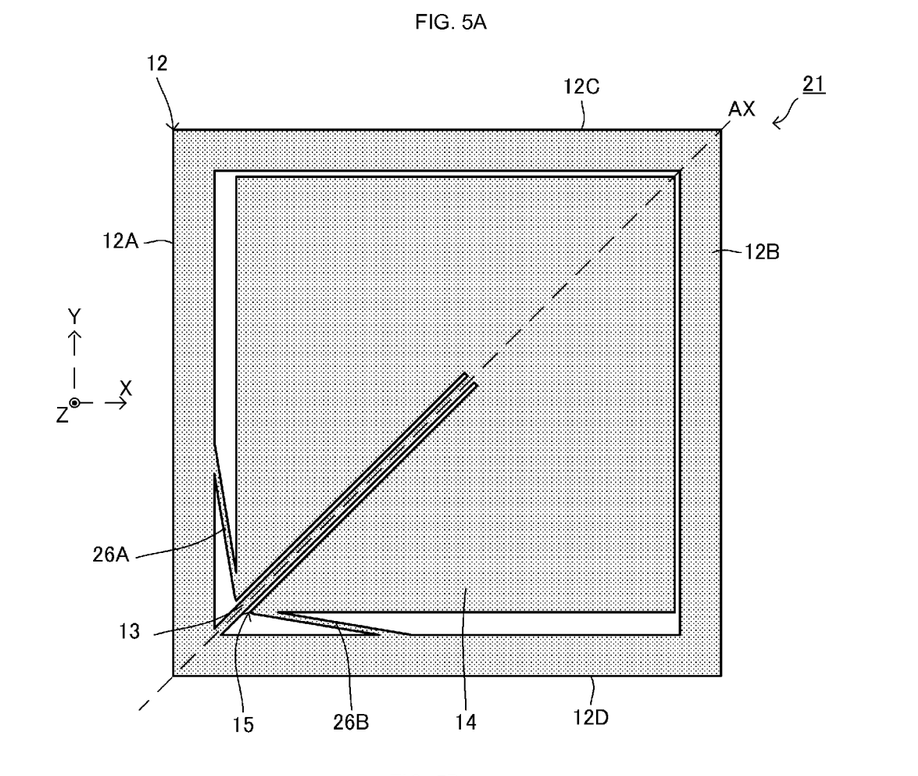
FIGS. 5A and 5B are explanatory views to explain shape setting of holding beams in an acceleration sensor device that constitutes an acceleration sensor according to a second preferred embodiment of the present invention.

The acceleration sensor according to the second preferred embodiment includes an acceleration sensor device 21 instead of the acceleration sensor device 11 of the acceleration sensor 1 according to the first preferred embodiment. FIG. 5A is a plan view, looking at an X-Y plane, of the acceleration sensor device 21 that constitutes the acceleration sensor according to the second preferred embodiment.

The acceleration sensor device 21 includes the fixation member 12, the vibrating beam 13, and the weight member 14 as in the acceleration sensor device 11 of the acceleration sensor 1 according to the first preferred embodiment. The acceleration sensor device 21 is different from the acceleration sensor device 11 in further including holding beams 26A and 26B. The holding beams 26A and 26B are arranged line-symmetrically with respect to the AX axis that is an axis of symmetry.

The holding beam 26A is a member having a linear shape when looked at in a plan view. More specifically, one end portion of the holding beam 26A in the lengthwise direction thereof is connected to the weight member 14 at one edge of the opening of the cutout 15, and the other end portion is connected to the fixation-member constituting portion 12A. The holding beam 26A is disposed to extend from a connected position between the holding beam 26A and the weight member 14 in the direction defining an angle of about 120° relative to the vibrating beam 13.

The holding beam 26B is a member having a linear shape when looked at in a plan view. More specifically, one end portion of the holding beam 26B in the lengthwise direction thereof is connected to the weight member 14 at the other edge of the opening of the cutout 15, and the other end portion is connected to the fixation-member constituting portion 12D. The holding beam 26B is disposed to extend from the position connected to the weight member 14 in the direction defining an angle of about 120° relative to the vibrating beam 13.

With the provision of the holding beams 26A and 26B, the weight member 14 is harder to displace in the X-axis direction and the Y-axis direction. Therefore, impact resistance is significantly increased in the acceleration sensor according to the second preferred embodiment. The connected positions of the holding beams 26A and 26B to the weight member 14 are preferably close to the connected position of the vibrating beam 13 to the fixation member 12. With such an arrangement, the impact resistance is further increased without reducing the displacement of the weight member 14 in the Z-axis direction.

Figure 5B:
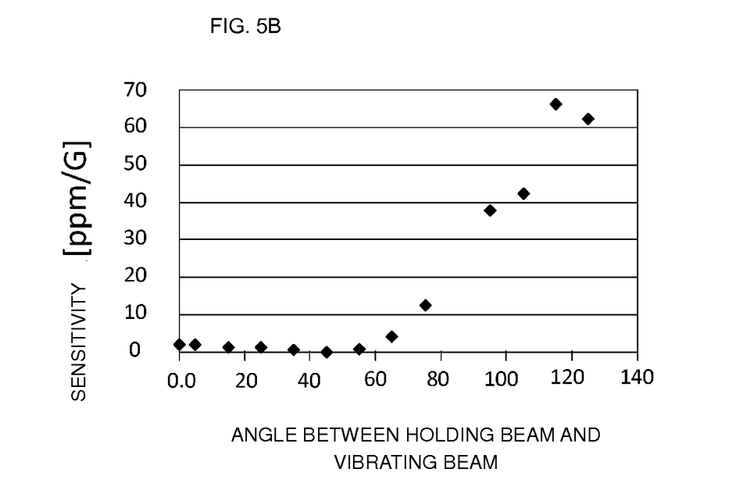

FIG. 5B is a graph plotting the relation between an angle defined by each of the holding beams 26A and 26B relative to the vibrating beam 13 in the X-Y plane and sensitivity of the acceleration sensor according to the second preferred embodiment for the acceleration in the Z-axis direction. When the angle defined by each of the holding beams 26A and 26B relative to the vibrating beam 13 is greater than about 0° and smaller than about 60°, the sensitivity for the acceleration in the Z-axis direction is not improved significantly. When the angle defined by each of the holding beams 26A and 26B relative to the vibrating beam 13 is not smaller than about 60°, the sensitivity for the acceleration in the Z-axis direction is increased.

Accordingly, in the case of providing the holding beams 26A and 26B, the angle defined by each of the holding beams 26A and 26B relative to the vibrating beam 13 is preferably not smaller than about 60° and more preferably not smaller than about 120°, for example. Additionally, the vibrating beam 13 is disposed such that the lengthwise direction thereof is aligned with the direction defining an angle of about 45° relative to the X-axis and the Y-axis in the X-Y plane. Therefore, if the angle defined by each of the holding beams 26A and 26B relative to the vibrating beam 13 is about 135°, the holding beams 26A and 26B are parallel or substantially parallel to the fixation-member constituting portions 12A and 12D, respectively. Thus, the angle defined by each of the holding beams 26A and 26B relative to the vibrating beam 13 preferably is to be smaller than about 135°, for example.

Third Preferred Embodiment

Figure 6:
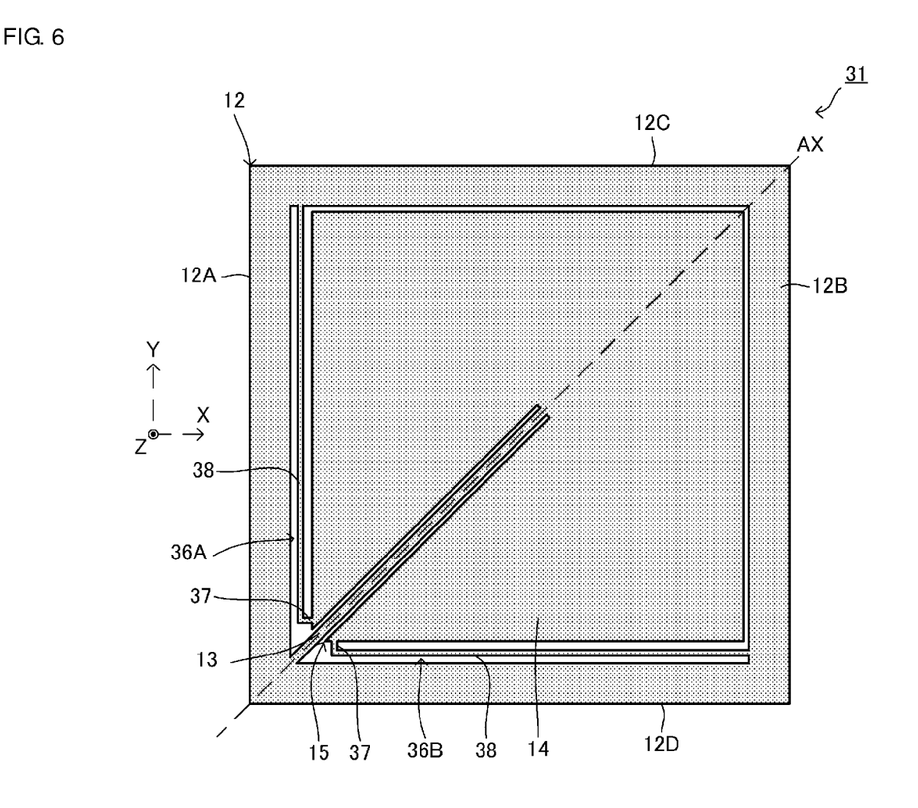
FIG. 6 is an explanatory view to explain an acceleration sensor according to a third preferred embodiment of the present invention.

An acceleration sensor according to a third preferred embodiment of the present invention will be described below. The acceleration sensor according to the third preferred embodiment includes an acceleration sensor device 31 instead of the acceleration sensor device 11 of the acceleration sensor 1 according to the first preferred embodiment. FIG. 6 is a plan view, looking at an X-Y plane, of the acceleration sensor device 31 that constitutes the acceleration sensor according to the third preferred embodiment.

The acceleration sensor device 31 includes the fixation member 12, the vibrating beam 13, and the weight member 14 as in the acceleration sensor device 11 of the acceleration sensor 1 according to the first preferred embodiment. The acceleration sensor device 31 is different from the acceleration sensor device 11 in further including holding beams 36A and 36B. The holding beams 36A and 36B are arranged line-symmetrically with respect to the AX axis that is an axis of symmetry.

The holding beam 36A is a member preferably having an L-shaped or substantially L-shaped configuration when looked at in a plan view. The holding beam 36A preferably includes a first partial holding beam 37 and a second partial holding beam 38. The first partial holding beam 37 is disposed to extend in the X-axis direction. One end portion of the first partial holding beam 37 in the lengthwise direction thereof is connected to the weight member 14 at one edge of the opening of the cutout 15, and the other end portion is connected to the second partial holding beam 38. The second partial holding beam 38 is disposed to extend in the Y-axis direction. One end portion of the second partial holding beam 38 in the lengthwise direction thereof is connected to the fixation-member constituting portion 12C, and the other end portion is connected to the first partial holding beam 37.

The holding beam 36B is a member preferably having an L-shaped or substantially L-shaped configuration when looked at in a plan view. The holding beam 36B preferably includes a first partial holding beam 37 and a second partial holding beam 38. The first partial holding beam 37 is disposed to extend in the Y-axis direction. One end portion of the first partial holding beam 37 in the lengthwise direction thereof is connected to the weight member 14 at the other edge of the opening of the cutout 15, and the other end portion is connected to the second partial holding beam 38. The second partial holding beam 38 is disposed to extend in the X-axis direction. One end portion of the second partial holding beam 38 in the lengthwise direction thereof is connected to the fixation-member constituting portion 12B, and the other end portion is connected to the first partial holding beam 37.

With the provision of the holding beams 36A and 36B, the weight member 14 is harder to displace in the X-axis direction and the Y-axis direction. Therefore, impact resistance is significantly increased in the acceleration sensor according to the third preferred embodiment.

Fourth Preferred Embodiment

Figure 7:
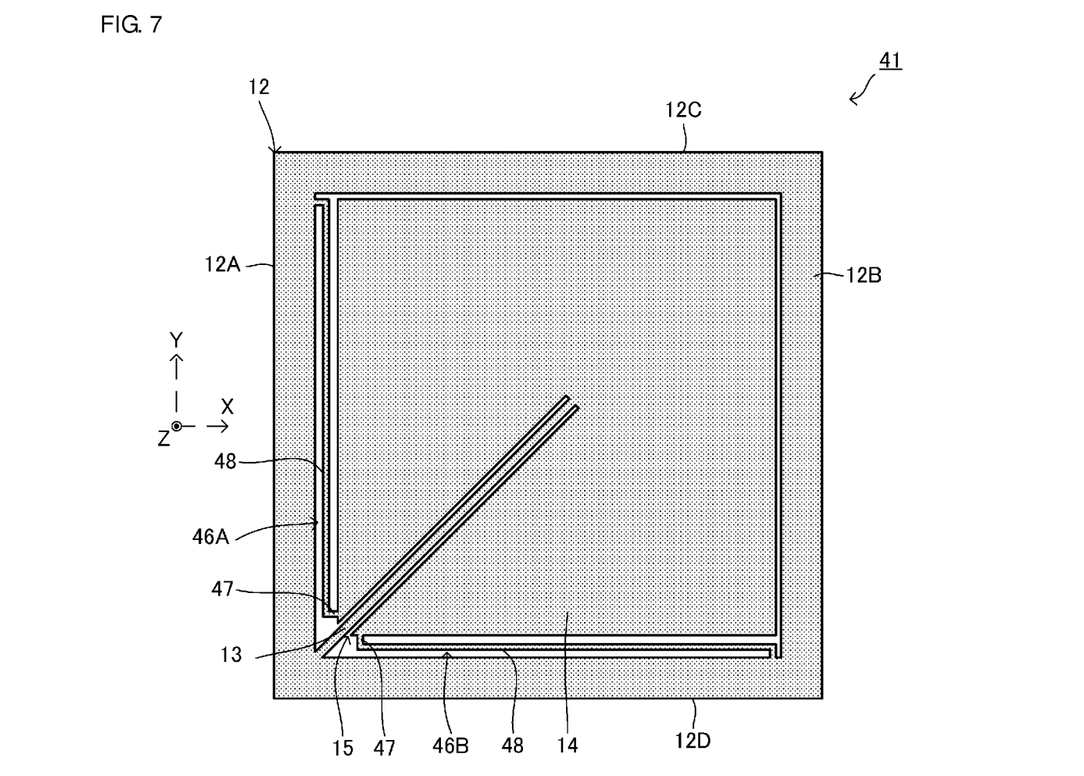
FIG. 7 is an explanatory view to explain an acceleration sensor according to a fourth preferred embodiment of the present invention.

An acceleration sensor according to a fourth preferred embodiment of the present invention will be described below. The acceleration sensor according to the fourth preferred embodiment includes an acceleration sensor device 41 instead of the acceleration sensor device 11 of the acceleration sensor 1 according to the first preferred embodiment. FIG. 7 is a plan view, looking at an X-Y plane, of the acceleration sensor device 41 that constitutes the acceleration sensor according to the fourth preferred embodiment.

The acceleration sensor device 41 includes the fixation member 12, the vibrating beam 13, and the weight member 14 as in the acceleration sensor device 11 of the acceleration sensor 1 according to the first preferred embodiment. The acceleration sensor device 41 is different from the acceleration sensor device 11 in further including holding beams 46A and 46B. The holding beams 46A and 46B are arranged line-symmetrically with respect to the AX axis that is an axis of symmetry.

The holding beam 46A preferably includes a first partial holding beam 47, a second partial holding beam 48, and a third partial holding beam 49. The first partial holding beam 47 is disposed to extend in the X-axis direction. One end portion of the first partial holding beam 47 in the lengthwise direction thereof is connected to the weight member 14 at one edge of the opening of the cutout 15, and the other end portion is connected to the second partial holding beam 48. The second partial holding beam 48 is disposed to extend in the Y-axis direction. One end portion of the second partial holding beam 48 in the lengthwise direction thereof is connected to the third partial holding beam 49, and the other end portion is connected to the first partial holding beam 47. The third partial holding beam 49 is disposed to extend in the X-axis direction. One end portion of the third partial holding beam 49 in the lengthwise direction thereof is connected to the second partial holding beam 48, and the other end portion is connected to the fixation-member constituting portion 12A.

The holding beam 46B preferably includes a first partial holding beam 47, a second partial holding beam 48, and a third partial holding beam 49. The first partial holding beam 47 is disposed to extend in the Y-axis direction. One end portion of the first partial holding beam 47 in the lengthwise direction thereof is connected to the weight member 14 at the other edge of the opening of the cutout 15, and the other end portion is connected to the second partial holding beam 48. The second partial holding beam 48 is disposed to extend in the X-axis direction. One end portion of the second partial holding beam 48 in the lengthwise direction thereof is connected to the third partial holding beam 49, and the other end portion is connected to the first partial holding beam 47. The third partial holding beam 49 is disposed to extend in the Y-axis direction. One end portion of the third partial holding beam 49 in the lengthwise direction thereof is connected to the second partial holding beam 48, and the other end portion is connected to the fixation-member constituting portion 12D.

With the provision of the holding beams 46A and 46B, the weight member 14 is harder to displace in the X-axis direction and the Y-axis direction. Therefore, impact resistance is significantly increased in the acceleration sensor according to the fourth preferred embodiment.

Fifth Preferred Embodiment

Figure 8:
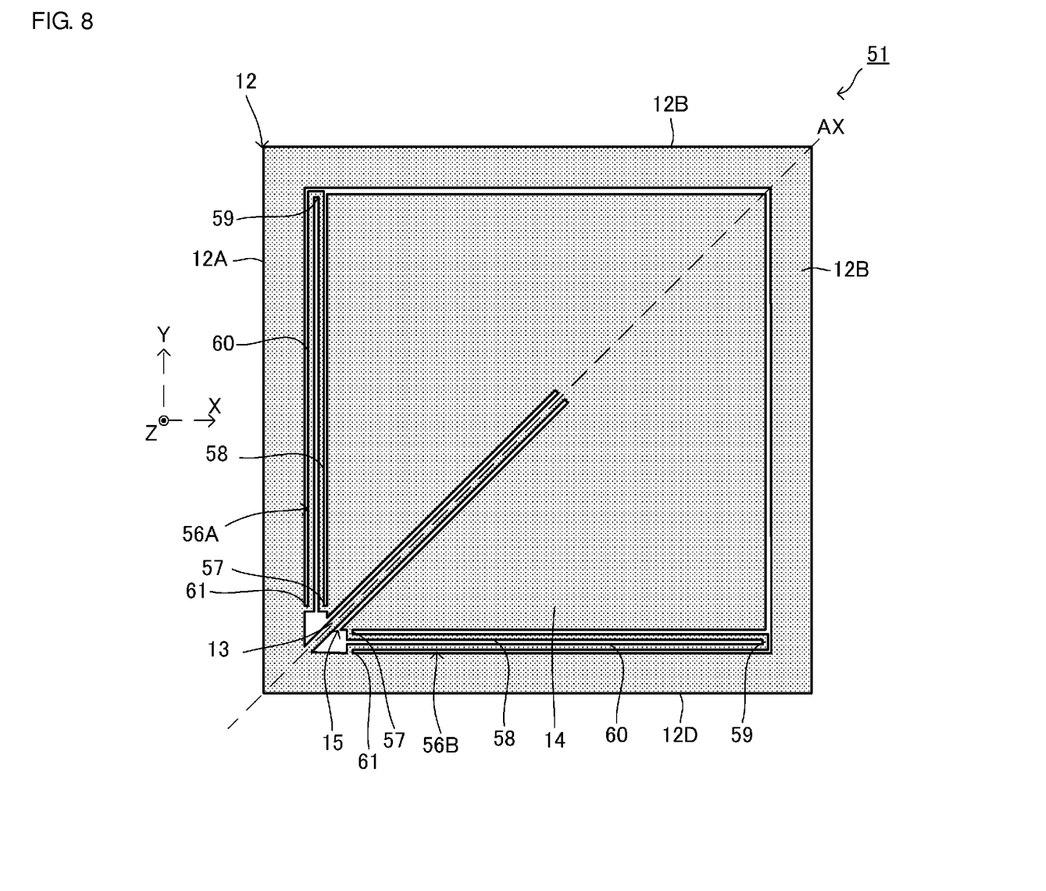
FIG. 8 is an explanatory view to explain an acceleration sensor according to a fifth preferred embodiment of the present invention.

An acceleration sensor according to a fifth preferred embodiment of the present invention will be described below. The acceleration sensor according to the fifth preferred embodiment includes an acceleration sensor device 51 instead of the acceleration sensor device 11 of the acceleration sensor 1 according to the first preferred embodiment. FIG. 8 is a plan view, looking at an X-Y plane, of the acceleration sensor device 51 that constitutes the acceleration sensor according to the fifth preferred embodiment.

The acceleration sensor device 51 includes the fixation member 12, the vibrating beam 13, and the weight member 14 as in the acceleration sensor device 11 of the acceleration sensor 1 according to the first preferred embodiment. The acceleration sensor device 51 is different from the acceleration sensor device 11 in further including holding beams 56A and 56B. The holding beams 56A and 56B are arranged line-symmetrically with respect to the AX axis that is an axis of symmetry.

The holding beam 56A preferably includes a first partial holding beam 57, a second partial holding beam 58, a third partial holding beam 59, a fourth partial holding beam 60, and a fifth partial holding beam 61. The first partial holding beam 57 is disposed to extend in the X-axis direction. One end portion of the first partial holding beam 57 in the lengthwise direction thereof is connected to the weight member 14 at one edge of the opening of the cutout 15, and the other end portion is connected to the second partial holding beam 58. The second partial holding beam 58 is disposed to extend in the Y-axis direction. One end portion of the second partial holding beam 58 in the lengthwise direction thereof is connected to the third partial holding beam 59, and the other end portion is connected to the first partial holding beam 57. The third partial holding beam 59 is disposed to extend in the X-axis direction. One end portion of the third partial holding beam 59 in the lengthwise direction thereof is connected to the second partial holding beam 58, and the other end portion is connected to the fourth partial holding beam 60. The fourth partial holding beam 60 is disposed to extend in the Y-axis direction. One end portion of the fourth partial holding beam 60 in the lengthwise direction thereof is connected to the third partial holding beam 59, and the other end portion is connected to the fifth partial holding beam 61. The fifth partial holding beam 61 is disposed to extend in the X-axis direction. One end portion of the fifth partial holding beam 61 in the lengthwise direction thereof is connected to the fourth partial holding beam 60, and the other end portion is connected to the fixation-member constituting portion 12A.

The holding beam 56B is constituted by a first partial holding beam 57, a second partial holding beam 58, a third partial holding beam 59, a fourth partial holding beam 60, and a fifth partial holding beam 61. The first partial holding beam 57 is disposed to extend in the Y-axis direction. One end portion of the first partial holding beam 57 in the lengthwise direction thereof is connected to the weight member 14 at the other edge of the opening of the cutout 15, and the other end portion is connected to the second partial holding beam 58. The second partial holding beam 58 is disposed to extend in the X-axis direction. One end portion of the second partial holding beam 58 in the lengthwise direction thereof is connected to the third partial holding beam 59, and the other end portion is connected to the first partial holding beam 57. The third partial holding beam 59 is disposed to extend in the Y-axis direction. One end portion of the third partial holding beam 59 in the lengthwise direction thereof is connected to the second partial holding beam 58, and the other end portion is connected to the fourth partial holding beam 60. The fourth partial holding beam 60 is disposed to extend in the X-axis direction. One end portion of the fourth partial holding beam 60 in the lengthwise direction thereof is connected to the third partial holding beam 59, and the other end portion is connected to the fifth partial holding beam 61. The fifth partial holding beam 61 is disposed to extend in the Y-axis direction. One end portion of the fifth partial holding beam 61 in the lengthwise direction thereof is connected to the fourth partial holding beam 60, and the other end portion is connected to the fixation-member constituting portion 12D.

With the provision of the holding beams 56A and 56B, the weight member 14 is harder to displace in the X-axis direction and the Y-axis direction. Therefore, impact resistance is significantly increased in the acceleration sensor according to the fifth preferred embodiment.

The acceleration sensor according to the present invention can be constituted as described above in the preferred embodiments. It is to be noted that the foregoing description is merely illustrative, and that the acceleration sensor of the present invention can be realized in forms modified as appropriate within the scope defined in the claims. For instance, while the foregoing preferred embodiments are described in connection with an example in which the piezoelectric layer and the lower electrode layer preferably are disposed only in the regions where the driver and the detector are disposed, the piezoelectric layer and the lower electrode layer may be disposed over the entire surface of the vibrating beam, and the driver and the detector may be each constituted depending on whether the upper electrode layer is disposed or not. The acceleration sensor according to the present invention can be realized in other various forms as well.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An acceleration sensor comprising:
   a fixation member;
   a weight member including two opposing sides parallel or substantially parallel to a first direction and two opposing sides parallel or substantially parallel to a second direction perpendicular or substantially perpendicular to the first direction when looked at in a plan view, the weight member including a cutout that extends in a direction of about 45° relative to the first direction and the second direction;
   a vibrating beam that linearly extends in the direction of about 45° relative to the first direction and the second direction when looked at in a plan view, and including a first end portion connected to the fixation member and a second end portion connected to the weight member, the vibrating beam being partially arranged within the cutout and supporting the weight member to be displaceable in a third direction that is perpendicular or substantially perpendicular to the first direction and the second direction;
   a driver disposed on the vibrating beam and vibrating the vibrating beam; and
   a detector disposed on the vibrating beam and configured to output a detection signal that is changed depending on deformation of the vibrating beam.

2. The acceleration sensor according to claim 1, wherein a connected position between the vibrating beam and the weight member is located near or adjacent to a barycentric position of the weight member.

3. The acceleration sensor according to claim 2, wherein when a reference size is defined as a lengthwise size of the vibrating beam in a state that the first end portion of the vibrating beam is connected to the fixation member, and that the second end portion of the vibrating beam is connected to the weight member at the barycentric position of the weight member, the lengthwise size of the vibrating beam is not less than about 0.6 times and less than about 1.2 times the reference size.

4. The acceleration sensor according to claim 3, wherein the lengthwise size of the vibrating beam is not less than about 1.0 times and less than about 1.2 times the reference size.

5. The acceleration sensor according to claim 1, further comprising a first holding beam and a second holding beam each including a first end portion connected to the fixation member and a second end portion connected to the weight member, the first holding beam and the second holding beam being arranged line-symmetrically with an axis of symmetry defined as an axis extending in the direction of about 45° relative to the first direction and the second direction.

6. The acceleration sensor according to claim 5, wherein the first holding beam is connected to the weight member at a first edge of an opening of the cutout, and the second holding beam is connected to the weight member at a second edge of the opening of the cutout.

7. The acceleration sensor according to claim 6, wherein an angle defined by each of the first and second holding beams relative to the vibrating beam is not smaller than about 60° and smaller than about 135°.

8. The acceleration sensor according to claim 5, wherein each of the first holding beam and the second holding beam is linear shaped.

9. The acceleration sensor according to claim 5, wherein each of the first holding beam and the second holding beam is L-shaped or substantially L-shaped.

10. The acceleration sensor according to claim 5, wherein each of the first holding beam and the second holding beam includes at least a pair of partial holding beams.

11. The acceleration sensor according to claim 5, wherein each of the first holding beam and the second holding beam includes at least three partial holding beams.

12. The acceleration sensor according to claim 5, wherein each of the first holding beam and the second holding beam includes at least five partial holding beams.

13. The acceleration sensor according to claim 1, further comprising a first holding beam including a first end portion connected to the fixation member and a second end portion connected to the weight member, the first holding beam including a first partial holding beam disposed to extend in the first direction and a second partial holding beam disposed to extend in the second direction; and
 a second holding beam including a first end portion connected to the fixation member and a second end portion connected to the weight member, the second holding beam including a first partial holding beam disposed to extend in the second direction and a second partial holding beam disposed to extend in the first direction.

14. The acceleration sensor according to claim 1, wherein the fixation member has an external shape that is a rectangular or substantially rectangular frame.

15. The acceleration sensor according to claim 1, wherein the weight member includes a substantially quadrangular plate.

16. The acceleration sensor according to claim 1, further comprising a piezoelectric layer and a lower electrode layer are disposed on the vibrating beam only where the driver and the detector are disposed.

17. The acceleration sensor according to claim 1, further comprising a piezoelectric layer and a lower electrode layer disposed along an entire surface of the vibrating beam.

* * * * *